Nov. 2, 1954   H. G. BECK   2,693,009
REFRIGERATOR DOOR GASKET
Filed Dec. 17, 1949   2 Sheets-Sheet 1

INVENTOR
Howard G. Beck
BY Evans & McCoy
ATTORNEYS

United States Patent Office 2,693,009
Patented Nov. 2, 1954

2,693,009

REFRIGERATOR DOOR GASKET

Howard G. Beck, Wabash, Ind., assignor to The General Tire and Rubber Company, Akron, Ohio, a corporation of Ohio Application December 17, 1949, Serial No. 133,651

5 Claims. (Cl. 20—35)

This invention relates to a resilient seal or gasket suitable for use on closure members such as refrigerator doors and the like. It particularly relates to such a gasket suitable for maintaining assembly of components of structures and capable of simultaneously providing a cushion member between such structures and other surfaces.

In seals and gaskets used on refrigerator doors it has been found that the most satisfactory gaskets for making an insulative seal between the closure members, for example, the door and the body of the refrigerator, are the type with a central hollow portion. This central hollow has two advantages. It forms a dead air space around the refrigerator door which insulates the interior of the refrigerator from the room and prevents loss of refrigeration and it gives the gasket a resilient compressible structure which allows a large surface width of the gasket to flatten against the frame surface with which it engages and thus insures an adequate seal. When a gasket with a central hollow section is used, however, it is very difficult to shape, form, or bend the gasket around corners without causing it to collapse upon itself. Prior to the present invention, the corners were preformed in the gasket by expensive vulcanizing and splicing processes to fit the various sized refrigerator doors to prevent this crimping and collapsing.

It is an object of the present invention to provide a gasket having a sealing hollow or tubular portion suitable for closure such as refrigerator doors and the like which gasket may be bent around corners without collapsing or kinking the hollow or tubular portion to destroy the effectiveness of the seal.

Another problem confronting the industry is the difficulty of replacing worn-out gaskets. Like all rubber articles, the refrigerator gaskets eventually develop a permanent set and lose their elasticity or become worn and cracked. In such a case, the gasket must be replaced with a new one to maintain the efficiency of the refrigerator. In general, this is a laborious process because the whole door panel must be removed along with numerous screws or the gasket must be pulled from the door panel to which it is adhered.

A further object of this invention is to provide a seal for closure members which is easily replaced when worn out.

Another object is to provide a seal for closure members which may be bent in the outline of the periphery of the closure member without kinking and which may be retained in position without screws, bolts, etc., and which cooperates with a mounting member to facilitate assembly of the components of the closure member.

Other objects will become apparent from further examination of this description and of the accompanying drawings in which like numerals of reference are used to designate like parts throughout the several views.

Figure 1:
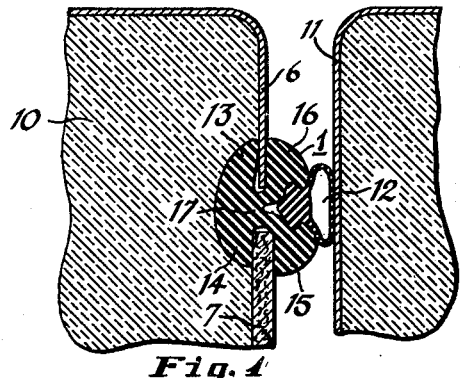
Figure 1 is a cross-sectional view through a portion of a refrigerator having a seal embodying the present invention in place to seal the space between the door and the cabinet thereof and having a mounting member disposed to maintain components of the refrigerator door in assembled relation.

Referring more particularly to the drawing, the linear mounting strip 1 is of uniform cross-section and is made of extruded soft flexible rubber or rubberlike material in any length desired.

The mounting strip 1 has flange portions 13, 14, 15 and 16 joined together by a central connecting portion 17. Successive flange portions 16 and 13 cooperate with the connecting portion 17 in defining one of the longitudinal panel edge receiving grooves 2 and successive flanges 14 and 15 cooperate with the connecting portion 17 in defining another of the panel edge receiving grooves 2. The mounting strip thus has at least two grooves 2, one of which is disposed on each of two generally opposite sides of the strip. The flange portions 16 and 15 disposed on one side of the longitudinal plane through the line joining the mid points of the bases of the grooves 2 are laterally spaced from each other to form a generally central groove or wedge receiving channel. The longitudinal bisecting plane of the groove 3 is thus at an angle with the longitudinal bisecting plane or planes of the groove 3. The flange portions adjacent the channel 3 are provided with linear beads or lips 4 which extend into the channel 3 along the upper region thereof to interlock with the sealing strip 5 as will be hereinafter shown.

The flange portions 12 and 15 are, because of the opening 3, readily moved toward each other to open the grooves 2 more widely and away from each other to compress against edges of members in said grooves. When the flanges 16 and 15 are moved outwardly against material in the grooves 2, the load is transmitted through the connecting portion 17 to cause the flange members 13 and 14, which may not be moved toward each other without compressing a mass of rubber therebetween, to bear more strongly against the opposite sides of edges of panels or material in the grooves 2. The mounting member 1, which serves to carry the sealing element, is generally similar to that described in Eichner Patent No. 2,189,138.

In accordance with the present invention a sealing strip that cooperates with the mounting member to provide wedging of the flanges of the latter to bind like components of a door or other closure member panels together and to provide a gasket or closure seal to prevent air leakage between the door and the cooperating cabinet. The sealing strip has a tube-like sealing portion 9 and an integral wedge or plug portion 5. The wedge or plug portion 5 and the channel 3 of the mounting member 1 are dimensioned so that the wedge portion may be pressed into the channel 3 to spring or press the flange portions 16 and 15 thereof toward the grooves 2 to clamp and hold the elements such as the edges of the door components firmly together. The wedge portion 5 performs the triple function of wedging the flange portions 16 and 15 of the sealing element against the panel edges, of maintaining the sealing or gasket portion 9 in desired position and in providing sufficient body of resilient material to prevent the kinking of the gasket portion to a great extent when the seal and mounting are formed around corners or bends to conform to the periphery of the closure member such as a refrigerator door having edges 6.

Figure 2:
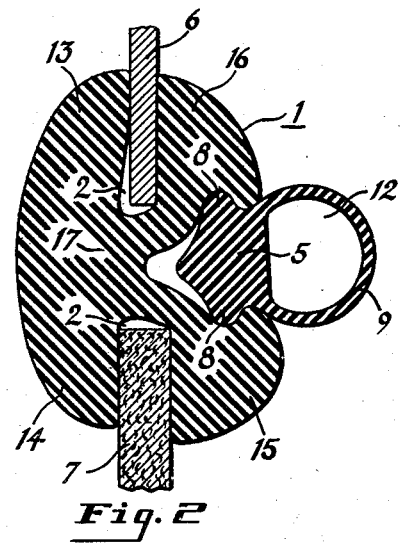
Fig. 2 is an enlarged cross-sectional view through a seal embodying the present invention and a cooperating mounting member showing edge portions of panels in a position as joined by said mounting member. This view is taken along line 2—2 in Fig. 6.
Figure 3:
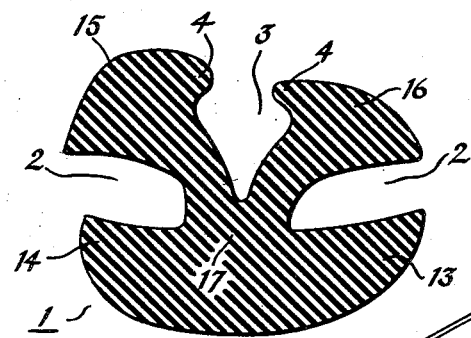
Fig. 3 is an enlarged cross-sectional view of a mounting for carrying the seal of the present invention and for joining edge portions of panel-like members together.
Figure 4:
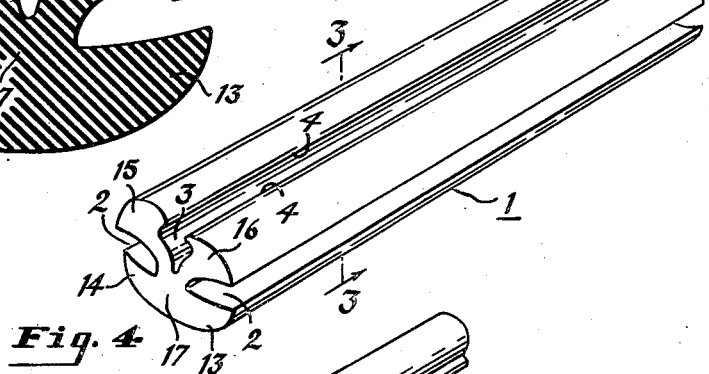
Fig. 4 is a perspective view of a linear portion of the mounting shown in Fig. 3.
Figure 5:
Fig. 5 is a similar perspective view of a seal embodying the present invention and adapted to cooperate with the mounting of Figs. 3 and 4.

The sealing portion 9 has a generally tubular shape forming a longitudinal hollow 12 with relatively thin flexible upper walls so that the seal can compress and flatten against the closure members when they are closed and provide a gasket to prevent air leakage therethrough, as illustrated in Fig. 1. The wedging portion 5 forms the lower wall portion of the integral tubular portion 9. It is essential in order to provide the nonkinking operation of the gaskets of the present invention that the wedge portion 5 be much thicker and much less easily compresses than the outer tubular wall portion 9. The wedge portion generally substantially fills the channel 3 so that the tubular or sealing portion protrudes from the body of the mounting member when the sealing element is disposed in its normal position as shown in Figures 1 and 2. It is the massiveness and comparative thickness of the wedge portion compared to the upper wall portion of the seal that permits the seal to be effective when bent transversely about lines in a longitudinal bisecting plane through the wedge portion and the sealing portion, which lines are perpendicular to the lines in other longitudinal planes through the sealing strip. The sealing strip which, as aforesaid, comprises a tubular hollow gasket portion 9 and the wedging and carrying portion 5, is preferably also formed of flexible soft vulcanized rubber-like material which may or may not be pigmented to provide an increased stiffness. Linearly spaced portions of the seal member like such spaced portions of the mounting have a uniform cross-section so that it may be easily and inexpensively extruded. The tubular sealing portion may be round or more or less oval in cross section as desired, and generally has a width and area larger than the width and area of the wedging and carrying portion 5 so that the hollow or cavity in the sealing portion has substantial volume and may be greatly deformed by pressure between the closure elements.

To assemble the mounting member, the edge 6 of the members to be joined thereby such as the metallic refrigerator door and the edge 7 of the central fiber insulation retaining panel or liner are fitted into the grooves 2 in the linear strip 1 and then the sealing element 5 is pressed into the central opening 3 so as to spring and press the body of the linear strip 1 about the panel edges 6 and 7 and thereby hold them firmly and securely in position. The plug element 5 is held in position by lateral pressure from the body of the strip and by interlocking of the beaded side portions 8 of the plug element with the lips 4 of the linear strip opening 3 as shown in Fig. 2.

Figure 6:
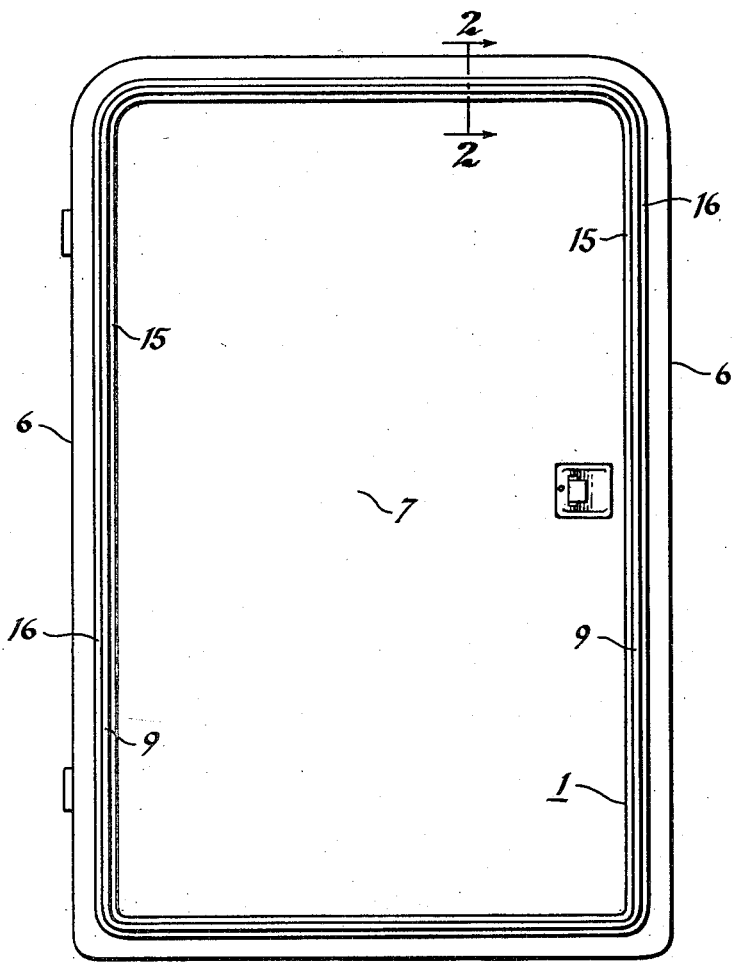
Fig. 6 is a front view of the inner face of a refrigerator door with the inside panel thereof installed by the mounting of this invention. This view shows the door frame, mounting, and inside panel as assembled.

In refrigerator doors illustrated in Figs. 1, 2 and 6 the mounting 1 is a continuous length around the panel edge and forms the sole means for attaching it firmly to the frame 6. The door frame 6 is preferably made of sheet steel or other metal with an enameled or vitreous finish and an outward curving or convex front face (not shown) and side flanges bent back into a U shape so that there is an inturned open edge substantially about the entire peripheral portion of the door frame. The inturned portion of the side flanges are generally parallel to the plane of the front of the refrigerator body when the door is closed. The inside panel 7 is preferably flat fiberboard or other nonheat-conductive material and fits into the opening in the inner face of the door frame, to cooperate with the door frame and integral outer door portion to completely enclose the insulation 10. The edges on both the door frame and panel do not have to be finished edges but do have to correspond roughly, taking into account the distance between the opposing grooves of the mounting portion of the sealing element. The grooves on either side of the mounting receive the panel edges and hold them as previously described.

Figure 6 particularly illustrates the inner face of an assembled door and shows how the sealing portion 9 of the mounting 1 extends around the periphery of the inner panel to give a complete heat seal against the refrigerator body frame. The seal itself flattens against the body frame as shown in Fig. 1 and excludes air and insulates against heat.

The insulative effect of the hollow 12 in the gasket of this invention is particularly effective because it is completely enclosed and consequently the air within it is not expelled every time the door is shut. Thus, the same air once chilled gives the insulation.

This gasket also can, as aforementioned, be formed or fitted around corners without any crimping because the wedge strip 5 and the mounting 1 provide the required bulk and body so that the gasket strip does not collapse upon itself.

In other words, the hollow bead section 9 of the seal is given sufficient rigidity by the solid plug section 5 so that the unit is capable of forming and fitting not otherwise possible. This allows the gasket to be supplied in strip form at the assembly location and fitted to any sized refrigerator door without costly preforming.

Still another advantage of this seal is the facile way in which it is assembled into the mounting. No screws or adhesive of any sort are required because the seal is merely pressed into the central opening in the mounting strip. When the bulbous seal portion has become set or cracket or otherwise worn out, it is just as easily pulled from the opening and a new strip inserted. This is an especially valuable feature for use in larger refrigerators for restaurants and the like.

Although the invention may be employed in various ways, only preferred embodiments have been illustrated and described. Other embodiments may be made within the invention as provided by the patent statutes.

What I claim is:

1. A mounting for joining panel edges comprising a linear strip of rubberlike material with opposing grooves therein to receive the panel edges, a wedge-shaped opening having lips on the opposite side edges thereof intermediate the grooves, and a separate linear wedging element of rubberlike material for insertion into said wedge-shaped opening so that after the panel edges have been fitted into the opposing grooves said wedging element can be inserted into said wedge-shaped opening to thereby expand and form the body of said linear strip into tight gripping engagement with the panel edges, said wedging element of rubberlike material being formed with a body portion proportioned and dimensioned to enter into said wedge shaped opening to spread said opening and interlock with said lips and being formed with an integral, hollow, bulbous structure extending outward from the body of the strip.

2. A mounting for joining panel edges comprising a linear strip of rubberlike material with opposing grooves therein to receive the panel edges, an opening with overhanging lips intermediate the grooves, and a separate, linear plug strip of rubberlike material with a lower beaded portion for insertion into said opening so that after the panel edges have been located in the grooves said plug portion can be inserted into said opening to thereby expand and form the body of the strip into tight gripping engagement with the panel edges and cause the overhanging lips of said opening to lock over the lower beaded portion of the plug strip and hold the same in this interlocking position, said plug strip of rubberlike material being formed with an integral, hollow, bulbous structure extending outward from the body of the strip and being proportioned and shaped to enter into said opening and be retained therein by interlocking with said lips.

3. A mounting for joining panel edges comprising a linear strip of rubberlike material with opposing grooves therein to receive the panel edges, an opening with overhanging lips intermediate the grooves, and a separate, linear plug strip of rubberlike material with a lower beaded portion for insertion into said opening so that after the panel edges have been located in the grooves said plug portion can be inserted into said opening to thereby expand and form the body of the strip into tight gripping engagement with the panel edges and cause the overhanging lips of said opening to lock over the lower beaded portion of the plug strip and hold the same in this interlocking position, said plug strip having attached solely thereto a bulbous, hollow, bead of rubberlike material extending outward from the body of the linear strip.

4. A mounting for joining panel edges comprising a linear strip of rubberlike material with opposing grooves therein to receive the panel edges, a wedge-shaped opening intermediate the grooves, said opening having overhanging lips on side edge portions thereof and a separate linear wedging element of rubberlike material for insertion into said wedge-shaped opening so that after the panel edges have been fitted into the opposing grooves said wedging element can be inserted into said wedge-shaped opening to thereby expand and form the body of the strip into tight gripping engagement with the panel edges, said wedging element having a body portion proportioned to fit into said opening and having beaded side edge portions to interlock with said lips and having attached solely thereto a bulbous, hollow, bead of rubberlike material extending outward from the body of the linear strip.

5. A mounting for joining panel edges comprising a linear strip of rubberlike material with opposing grooves therein to receive the panel edges, a wedge-shaped opening intermediate the grooves, sides of said opening having overhanging lip portions and a separate, linear, wedging element for insertion into said wedge-shaped opening so that after the panel edges have been fitted into the opposing grooves said wedging element can be inserted into said wedge-shaped opening to thereby expand and form the body of the strip into tight gripping engagement with the panel edges, said wedging element having a generally wedge shaped body portion proportioned and shaped to interfit in said opening in interlocking relation with said lips and having attached to said body portion a bulbous, hollow, bead of rubberlike material extending outward from the body of the linear strip.

References Cited in the file of this patent

UNITED STATES PATENTS

| Number | Name | Date |
|---|---|---|
| 1,998,791 | Schanz | Apr. 23, 1935 |
| 2,139,329 | Fessler | Dec. 6, 1938 |
| 2,189,138 | Eichner | Feb. 6, 1940 |
| 2,215,889 | Swedman | Sept. 24, 1940 |
| 2,256,013 | Brouse | Sept. 16, 1941 |
| 2,367,409 | Kuhler | Jan. 16, 1945 |
| 2,492,566 | Geyer | Dec. 27, 1949 |
| 2,607,966 | Beck | Aug. 26, 1952 |

FOREIGN PATENTS

| Number | Country | Date |
|---|---|---|
| 793,836 | France | Nov. 23, 1935 |